United States Patent [19]

Skilbeck

[11] Patent Number: 5,350,813

[45] Date of Patent: Sep. 27, 1994

[54] FLUID ASSISTED DEVOLATILIZATION

[75] Inventor: John P. Skilbeck, Lunenburg, Mass.

[73] Assignee: Novacor Chemicals (International) S.A., Fribourg, Switzerland

[21] Appl. No.: 68,536

[22] Filed: May 27, 1993

Related U.S. Application Data

[63] Continuation-in-part of Ser. No. 919,877, Jul. 27, 1992, abandoned.

[51] Int. Cl.$^5$ .............................. C08F 6/00; C08J 3/00
[52] U.S. Cl. .................................. 528/493; 528/495; 528/496
[58] Field of Search .................... 528/493, 495, 496

[56] References Cited

U.S. PATENT DOCUMENTS 3,987,235  10/1976  Fujimoto .............................. 528/481
5,118,388   6/1992  Aboul-Nasr ........................... 159/2.1

*Primary Examiner*—Paul R. Michl
*Assistant Examiner*—LaVonda R. DeWitt
*Attorney, Agent, or Firm*—Bruce E. Harang

[57] ABSTRACT

A polymer melt may be devolatilized to less than 500, preferably less than 150 ppm of residual volatile material by injecting into the melt an amount of fluid which will condense but not freeze at pressures of less than about 20 mm Hg, in an amount greater than the amount of residual volatile material in the polymer melt, typically not more than about 10 weight % and passing the melt through a zone of pressure of 8 mm of Hg or less at a temperature of from 200° to 350° C.

11 Claims, 1 Drawing Sheet

FLUID ASSISTED DEVOLATILIZATION

This is a continuation-in-part of copending application Ser. No. 07/919,877 filed Jul. 27, 1992, now abandoned.

FIELD OF THE INVENTION

The present invention relates to the devolatilization of melts of one or more polymers. More particularly the present invention relates to devolatilization of polymers of vinyl aromatic monomers or blends of polymers of vinyl aromatic monomers and polyphenylene oxide.

BACKGROUND OF THE INVENTION

U.S. Pat. No. 3,773,740, issued Nov. 20, 1973 in the name of T. T. Szabo assigned to Union Carbide disclosed the devolatilization of polymers in a flash chamber. Typically the polymers are polymers containing at least one vinyl aromatic monomer. The patent teaches that from 0.50 to 2.75 weight % of water may be injected into a melt of the polymer. The pressure on the polymer melt is suddenly lowered to from about 20 to 40 mm of Hg (torr). The water in the polymer melt is flashed to help remove residual vinyl aromatic monomers to about 0.30 weight % or about 3,000 parts per million (ppm).

U.S. Pat. No. 4,195,169, issued Mar. 25, 1980, assigned to The Dow Chemical Company discloses devolatilizing polymers of styrene and acrylic acid or methacrylic acid by contacting the polymer melt with a compound of the formula ROH wherein R may be hydrogen or an alkyl radical. The devolatilization process does not increase the gel content in the resulting polymer (i.e. there are no insolubles in the resulting polymer). The polymers of the present invention are of a different polymeric character in that they do not contain any free carboxylic acid.

Currently, the producers of polymers of vinyl aromatic monomers are seeking to produce polymers or blends of such polymers which contain less than about 200 ppm of monomers, oligomers and solvent.

The Union Carbide patent does not teach one how to reduce monomer and solvent levels to those required today. A simple approach might be to merely further reduce the pressure within the devolatilizer. However, at pressures of about 10 torr and less the water injected into the polymer melt cannot be cooled to sufficiently low temperatures to condense, because it will freeze at such low pressures in the condenser system between the devolatilizer and the vacuum source. Vapour pressure tables of water show at pressures of less than 4.579 mm of Hg water has to be cooled to less than 0° C. to condense. Accordingly, if the pressure in the condenser is less than about 5 mm Hg it is very difficult to keep the system operational.

Operating tinder very closely controlled procedures and by selecting lots of polymer from a particular batch about the lowest levels of residual monomer, oligomer and solvent that can be obtained are in the range of greater than 175 ppm, typically from 200 to 175 ppm.

Applicants have discovered that one method for overcoming the drawback of the Union Carbide technology is to use a suitably volatile fluid (e.g. liquid or gas) which does not freeze at the temperature and pressure conditions in the condenser.

As a result it is possible to operate a fluid assisted devolatilizer at pressures below about 10, preferably less than 8 torr and to consistently obtain polymers having levels of monomers and solvents of typically less than 150, more typically less than 125, most typically less than 100, preferably less than 75, most preferably less than 50 ppm.

U.S. Pat. No. 5,102,591, issued Apr. 7, 1992 discloses a process to devolatilize a polymer blend of styrene and polyphenylene oxide by passing the blend through an extrusion devolatilizer. That is an extruder equipped with vacuum ports. In such a process the polymer or polymer blend does not descend vertically through a flash chamber. Rather, the melt is passed horizontally in the barrel of an extruder beneath a vacuum port. Additionally, the reference teaches a two-stage devolatilization. That is, first the polyphenylene oxide is devolatilized, then the polystyrene is added to the polyphenylene oxide and the blend is then devolatilized.

U.S. Pat. No. 5,145,728 discloses reducing the residual monomer and oligomer content of polystyrene by blending with it a block copolymer of styrene and butadiene, typically such as those sold under the trade mark K RESIN. The reference does not contemplate passing the polymer melt through a flash chamber devolatilizer. Rather, the polymer is devolatilized conventionally, then extrusion blended with the block copolymer. In the example at columns 4 and 5, the starting polymer is devolatilized using a screw extruder and water. Interestingly, the residual monomer and solvent level was not reduced below 150 ppm. The present disclosure does not contemplate such a process and does not contemplate a blend comprising block copolymers of a block of one or more $C_{8-12}$ vinyl aromatic monomers which are unsubstituted or substituted by a $C_{1-4}$ alkyl radical and one or more blocks of one or more $C_{4-6}$ conjugated diolefins.

The process of the present invention has an advantage over the extrusion processes as there is a shorter history of shear under high temperature. Each time a polymer blend is passed through an extruder there is some degradation of polymer, particularly a reduction of molecular weight. Furthermore, extrusion processes are relatively expensive.

SUMMARY OF THE INVENTION

The present invention provides a process for reducing the amount of residual monomer, dimer, trimer and solvent to less than 150 parts per million in a polymer or polymer blend, containing less than 2 weight % of such residual monomer and solvent, which process comprises:

(i) heating and maintaining said polymer or polymer blend at a temperature from 200°–270° C.;

(ii) injecting into said polymer or polymer blend an amount of an organic fluid, preferably liquid greater than the amount of residual monomer and solvent in said polymer or polymer blend but less than 10 weight %, said injection being at temperatures of from 200°–270° C. and pressures from 500 to 1500 psi and said organic liquid being selected from the group consisting of $C_{1-4}$ alkanols and $C_{1-4}$ ketones; and (iii) passing said polymer or polymer blend in the form of strands vertically through a flash chamber devolatilizer maintained at a temperature from 200°–270° C. and which has a pressure maintained at less than 8 torr.

DETAILED DESCRIPTION

Figure 1:
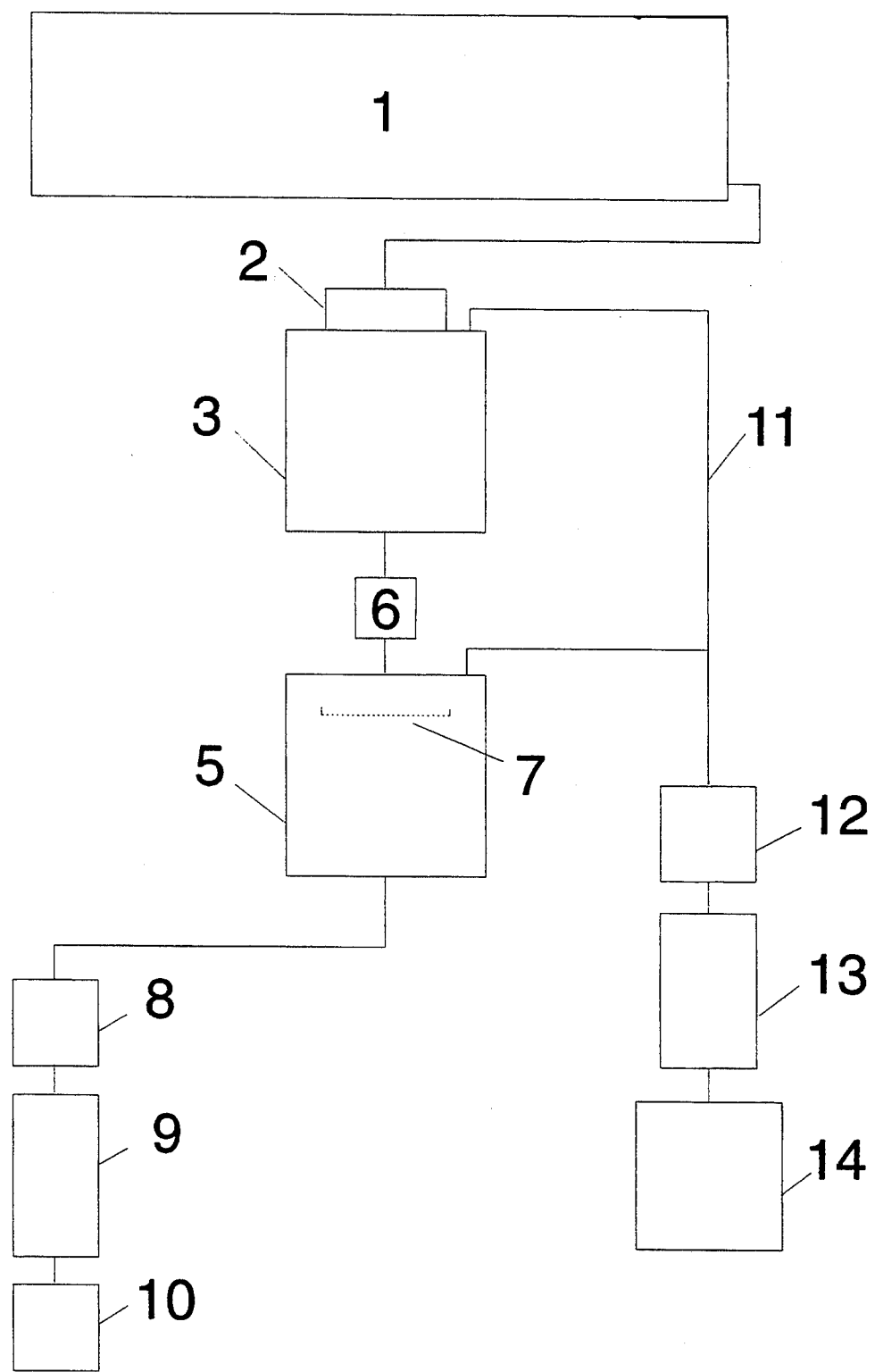
FIG. 1 is a schematic diagram of the cooperating arrangement of devolatilizer, gas ejector, condenser and vacuum source which may be used in accordance with the present invention.

The polymer or polymer blend in accordance with the, present invention contains less than 2, preferably less than 1, most preferably less than 0.5 weight % or residual monomer and solvent just before injection of the fluid into the polymer. The process of the present invention is carried ore to provide a polymer or polymer blend containing typically less than 150, more typically less than 125, most typically less than 100, preferably less than 75, most preferably less than 50 parts per million of residual monomers and solvent.

One embodiment of the present invention will now be briefly described in conjunction with the drawing.

In the bulk or solution polymerization of a number of monomers containing one or more vinyl aromatic monomers, the monomers are fed to one or more reactors where they are polymerized to at least about 65% conversion. The polymer leaves the reactor, in the case of a tower process as illustrated by U.S. Pat. No. 3,658,946, issued Apr. 25, 1972, assigned to BASF and U.S. Pat. No. 3,660,535, issued May 2, 1972, assigned to the Dow Chemical Company, or the last reactor 1 in the case of a Monsanto type process as illustrated by U.S. Pat. No. 3,903,202, issued Sep. 2, 1975, assigned to Monsanto, and travels through a preheater 2. The preheater heats the polymer melt to a temperature of from about 230° to 260° C. to increase the vapour pressure of the volatiles and reduce the viscosity of the melt to permit it to foam. An additional problem which must be considered is the cooling of the polymer due to the latent heat of vaporization of the volatiles as the melt travels through the devolatilizer.

The heated polymer melt passes into the first stage 3 of a two-stage devolatilizer. The devolatilizer is operated at temperatures from 200° to 350°, preferably from 200° to 270°, most preferably from 225° to 235° C. Typically the pressure in the first stage of the devolatilizer will be from 10 to 45, preferably less than 20 mm Hg. The polymer melt then descends to the bottom of the first stage 3 of the devolatilizer. As the polymer melt descends through the devolatilizer, volatiles within the melt are flashed off. The polymer melt at the bottom of the first stage 3 of the two-stage reactor should have a residual volatile content of less than 2 weight %.

The melt is then collected and pumped to the second stage 5 of the two-stage devolatilizer. Between the first and second stage of the two-stage devolatilizer is a fluid injector unit 6. As noted above, the figure is a schematic diagram. The devolatilizer could comprise more than two stages.

Fluid injector 6 is operated at temperatures frown 200° to 270° C., preferably at temperatures comparable to those of the devolatilizer, and at pressures from 500 to 1500 psi. The fluid injector is operated to provide typically less than 10, more typically less than 5, most typically less than 2, preferably less than 1, most preferably from 0.45 to 0.74, most desirably from 0.05 to 0.60 weight % of fluid into the polymer melt. Generally, for the injection of a volatile fluid to be useful in the reduction of volatile material in a polymer melt the amount of fluid injected into the melt should be greater than the amount of residual volatile materials in the melt. From a practical point of view, the amount of fluid injected into the melt should be in accordance with the above teaching.

Preferably the fluid injector contains a mixing means such as a static mixer.

The mixture of polymer melt and fluid then passes through the second stage 5 of the devolatilizer. The devolatilizer is operated at temperatures from 200° to 270°, preferably from 210° to 255°, most preferably from 225° to 235° C. The second stage 5 of the devolatilizer should be operated so that the polymer melt is exposed to a pressure of less than 8, preferably less than 5, most preferably less than 3 mm Hg.

To increase the residence time of the polymer melt in the second stage 5 of the devolatilizer, a distributor tray 7 may be inside the devolatilizer. However, as noted above, a distributor tray is preferred, but not essential, in accordance with the present invention.

To provide suitable appropriate residence times within the stages of the falling strand devolatilizer, distributor trays 4 and 7 may be inside the devolatilizer. Various distributor designs have been described in U.S. Pat. No. 4,934,433 issued Jun. 19, 1990, U.S. Pat. No. 5,069,750 issued Dec. 3, 1991 and U.S. patent application Ser. No. 507,740 filed Apr. 12, 1990, all assigned to Polysar Financial Services S.A., now renamed Novacor Chemicals (International) S.A.

As the polymer descends through the last stage 5 of the devolatilizer typically in the form of a strand, it is deposited and usually held on the distributor in the form of a foam. The fluid in the polymer and residual monomer and solvent are flashed off. The polymer melt then descends to the bottom of the second stage 5 of the devolatilizer, or more generally, of the last stage of the devolatilizer, as the case may be. The melt is then pumped to a strand forming die 8, and the strands typically pass through a cooling water bath 9 into a pelletizer 10.

The fluid vapour and volatile monomer(s) and solvent(s) and any non-condensable gases are withdrawn overhead from the devolatilizer. In the figure, for the sake of convenience, only one common line 11 is shown. From a practical point of view, there may be several lines.

If the fluid would freeze before condensing at the pressure conditions within the condenser, then it is important that in the vapour line coming from the devolatilizer being operated at pressures of less than 8 mm Hg and the condenser 13, and between the devolatilizer and the condenser, that there be a gas ejector 12, preferably useful with steam or other inert gases. The rate of gas ejection should be such that the pressure in the last stage of the devolarilizer can be maintained below 8 mm Hg and the pressure in the condenser can be maintained to permit the condensation of the fluid without freezing. However, the present invention overcomes the need for the gas ejector 12 by selecting a fluid which will not freeze at the conditions in the condenser 13.

The fluids recovered from the condenser may then be separated in a conventional manner, such as by distillation. Preferably, the organic liquid should be highly volatile. That is, at 25° C. it should have a vapour pressure greater than that of water at 25° C.

Downstream of the condenser is a vacuum source 14, which should be of sufficient size so as to be capable of maintaining the vacuum throughout the system.

Typically the polymer melt is a melt of one or more polymers selected from the group of polymers including polystyrene, high impact polystyrene (HIPS), styrene acrylonitrile polymers (SAN), acrylonitrile butadiene styrene polymers (ABS), styrene methyl methacrylate polymers, and butadiene styrene methyl methacrylate polymers (MBS), and one or more of the aforesaid polymers, most preferably high impact polystyrene blended with polyphenylene oxide.

Generally, the polymers which may be treated in accordance with the present invention comprise:
(i) from 100 to 30, preferably from 100 to 50, most preferably from 100 to 70 weight % of one or more monomers selected from the group consisting of: $C_{8-12}$ vinyl aromatic monomers which are unsubstituted or substituted by a $C_{1-4}$ alkyl radical; and
(ii) from 0 to 70, preferably 0 to 50, most preferably from 0 to 30 weight % of one more monomers selected from the group consisting of: $C_{1-4}$ alkyl esters of acrylic or methacrylic acid; acrylonitrile and methacrylonitrile;

which polymers may be grafted on to from 0 to 40, preferably from 0 to 20, weight % of one or more rubbery polymers selected from the group consisting of: one or more $C_{4-6}$ conjugated diolefin monomers; and polymers comprising from 20 to 80, preferably from 40 to 60, weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, α-methyl styrene, and p-methyl styrene. Suitable esters of acrylic or methacrylic acid include methyl methacrylate, ethyl methacrylate, methyl acrylate, ethyl acrylate, and butyl acrylate. Suitable nitriles include acrylonitrile and methacrylonitrile. Suitable conjugated diolefin monomers include butadiene and isoprene.

Most preferably the polymer melt is polystyrene or high impact polystyrene (HIPS).

The present invention has been described in terms of the devolatilization of a polymer melt of polystyrene. However, the present invention may also be used in association with melts of other polymers such as acrylonitrile butadiene styrene polymers (ABS), styrene acrylonitrile polymers (SAN), and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide (trademark) and polystyrene or a blend of polyphenylene oxide and high impact polystyrene. Typically, the weight ratio of styrene to polyphenylene oxide is from 90:10 to 10:90, preferably from 70:30 to 10:90.

The organic fluid, preferably a liquid injected into the melt of one or more polymers, may be selected from the group consisting of $C_{1-4}$ alkanols and $C_{1-4}$ ketones. Particularly useful organic liquids include methanol, ethanol and acetone (dimethyl ketone). Preferably, the organic fluid will have a molecular weight less than 75, most preferably not greater than 58.

Other applications of the present invention will be apparent to those skilled in the art.

The present invention will now be illustrated by the following examples in which, unless otherwise specified, parts is parts by weight (i.e. grams) and % is weight %.

SAMPLE PREPARATION

Samples of commercially available crystal polystyrene were mixed with various amounts of a specially prepared rubber modified polystyrene which contained about 1.2 weight % residual styrene monomer. The mixture of pellets was passed through an extruder to achieve a homogeneous melt blend. The extruder provided motive pressure to pass the melt blend through a static mixing device. Between the extruder and the mixing device, various amounts of water (control) and methanol were injected into the melt. The melt was pumped into the devolatilizer onto a distributor. The polymer coming out of the devolatilizer was analyzed for residual monomer. The conditions and results of the experiments are set forth in Table 1.

TABLE 1

| Fluid | Vacuum (Torr) | Fluid Rate (Weight/Percent) | Melt Temperature °F. | Residual Styrene (PPM) | Total Volatile Residuals (PPM) |
|---|---|---|---|---|---|
| $H_2O$ | 2.5 | 0.5 | 427 | 30 | 34 |
| MeOH | 3.0 | 0.5 | 428 | 50 | 55 |

These results show that it is possible to obtain results comparable to water aided devolatilization using a fluid which does not freeze at the pressure conditions in the condenser.

What is claimed is:
1. A process for reducing the amount of residual monomer and solvent to less than 75 parts per million in a polymer or polymer blend, containing less than 1 weight % of such residual monomer, dimer, trimer and solvent, which process comprises:
   (i) heating and maintaining said polymer or polymer blend at a temperature from 200°-270° C.;
   (ii) injecting into said polymer or polymer blend an amount of an organic fluid greater than the amount of residual monomer, dimer, trimer and solvent in said polymer or polymer blend but less than 1 weight %, said injection being at temperature of from 200°-270° C. and pressures from 500 to 1500 psi and said organic fluid being selected from the group consisting of $C_{1-4}$ alkanols and $C_{1-4}$ ketones: and
   (iii) passing said polymer or polymer blend in the form of strands vertically through a flash chamber devolatilizer maintained at a temperature from 225°-235° C. and which has a pressure maintained at less than 5 torr.

2. The process according to claim 1, wherein said organic fluid is a liquid selected from the group consisting of methanol, ethanol, and acetone.

3. The process according to claim 2, further comprising depositing said polymer or polymer blend on a distributor within said flash chamber.

4. The process according to claim 2, wherein the pressure within said flash chamber is below 3 torr.

5. The process according to claim 3, wherein the pressure within said flash chamber is below 3 torr.

6. The process according to claim 4, wherein said polymer melt comprises one or more polymers selected from tile group of polymers consisting of:
   (i) from 100 to 30, weight % of one or more monomers selected from tile group consisting of: $C_{8-12}$ vinyl aromatic monomers which are unsubstituted or substituted by a $C_{1-4}$ alkyl radical;

(ii) from 0 to 70, weight % of one more monomers selected from the group consisting of: $C_{1-4}$ alkyl esters of acrylic or methacrylic acid; acrylonitrile and methacrylonitrile;

which polymers may be grafted on to from 0 to 40, weight % of one or more rubbery polymers selected from the group consisting of:

(iii) one or more $C_{4-6}$ conjugated diolefin monomers; and (iv) polymers comprising from 20 to 80, weight % of one or more $C_{8-12}$ vinyl aromatic monomers and from 80 to 20, weight % of one or more $C_{4-6}$ conjugated diolefins.

7. The process according to claim 5, wherein said polymer melt comprises one or more polymers selected from the group of polymers consisting of:

(i) from 100 to 30, weight % of one or more monomers selected from the group consisting of: $C_{8-12}$ vinyl aromatic monomers which are unsubstituted or substituted by a $C_{1-4}$ alkyl radical;

(ii) from 0 to 70, weight % of one more monomers selected from the group consisting of: $C_{1-4}$ alkyl esters of acrylic or methacrylic acid; acrylonitrile and methacrylonitrile;

which polymers may be grafted on to from 0 to 40, weight % of one or more rubbery polymers selected from the group consisting of:

(iii) one or more $C_{4-6}$ conjugated diolefin monomers; and (iv) polymers comprising from 20 to 80, weight % of one or more $C_{8-12}$ vinyl aromatic monomers and from 80 to 20, weight % of one or more $C_{4-6}$ conjugated diolefins.

8. The process according to claim 6, wherein said polymer or polymer blend is polystyrene.

9. The process according to claim 6, wherein said polymer or polymer blend is a blend of polyphenylene oxide and polystyrene.

10. The process according to claim 7, wherein said polymer or polymer blend is polystyrene.

11. The process according to claim 7, wherein said polymer or polymer blend is a blend of polyphenylene oxide and polystyrene.

* * * * *